(12) United States Patent
Wagner (10) Patent No.: US 8,833,785 B2
(45) Date of Patent: Sep. 16, 2014

(54) CLAMPING SYSTEM FOR A VEHICLE FORK WITH A SUSPENSION SYSTEM

(75) Inventor: Stéphane Wagner, Uxegney (FR)

(73) Assignee: Eurl Stephane Wagner Mecanique, N de Gestion (FR)

( * ) Notice: Subject to any disclaimer, the term of this patent is extended or adjusted under 35 U.S.C. 154(b) by 3 days.

(21) Appl. No.: 13/512,821

(22) PCT Filed: Nov. 29, 2010

(86) PCT No.: PCT/FR2010/052558
§ 371 (c)(1),
(2), (4) Date: May 30, 2012

(87) PCT Pub. No.: WO2011/067526
PCT Pub. Date: Jun. 9, 2011

(65) Prior Publication Data
US 2012/0235378 A1    Sep. 20, 2012

(30) Foreign Application Priority Data
Dec. 3, 2009  (FR) ..................................... 09 58626

(51) Int. Cl.
*B62K 21/04*  (2006.01)
*B62K 25/08*  (2006.01)
*B62K 21/00*  (2006.01)
*B62K 21/18*  (2006.01)

(52) U.S. Cl.
CPC ................. *B62K 21/18* (2013.01); *B62K 25/08* (2013.01); *B62K 21/00* (2013.01); *B62K 21/04* (2013.01)
USPC ........................... 280/279; 280/276; 180/219

(58) Field of Classification Search
USPC ................................... 280/279, 276; 180/219
See application file for complete search history.

(56) References Cited

U.S. PATENT DOCUMENTS

| | | | |
|---|---|---|---|
| 4,565,384 A | | 1/1986 | Dehnisch |
| 4,705,285 A * | | 11/1987 | Yoshida .......................... 280/279 |
| 5,494,302 A * | | 2/1996 | Farris et al. .................... 280/276 |
| 5,715,903 A * | | 2/1998 | Summers et al. .............. 180/219 |
| 6,241,391 B1 * | | 6/2001 | Hoose .............................. 384/49 |
| 6,457,732 B2 * | | 10/2002 | Ito et al. .......................... 280/277 |
| 6,488,300 B2 * | | 12/2002 | Ito et al. .......................... 280/276 |
| 6,520,524 B1 * | | 2/2003 | Costa ............................. 280/276 |

(Continued)

FOREIGN PATENT DOCUMENTS

| | | |
|---|---|---|
| BE | 512 578 A | 2/1954 |
| CN | 200948858 Y | 9/2007 |

(Continued)

*Primary Examiner* — Kevin Hurley
*Assistant Examiner* — Michael Stabley
(74) *Attorney, Agent, or Firm* — Arent Fox LLP (57) ABSTRACT

A clamping system for a vehicle fork with a suspension system features a lower triple clamp (24) and an upper support (25), the lower triple clamp (24) having a lower plate (242) and a fork shaft (240) to be mounted in a way that enables it to pivot on the vehicle frame (23), the lower plate (242) having two lower housings (241a, 241b) to receive two shock absorbers (21a, 21b) set parallel to one another and in front of the fork shaft (240). The clamping system (2) includes fitting devices to assemble the upper support (25) on the fork shaft (240) and stiffening devices (26a, 26b) set apart from the fork shaft (240) to maintain the relative orientations of the lower triple clamp (24) and the upper support (25).

19 Claims, 13 Drawing Sheets

(56) References Cited

U.S. PATENT DOCUMENTS

| | | | |
|---|---|---|---|
| 6,533,305 B1 * | 3/2003 | Falk | 280/276 |
| 6,908,092 B2 * | 6/2005 | Kofuji et al. | 280/276 |
| 6,953,201 B1 * | 10/2005 | VanDeMortel | 280/276 |
| 6,976,691 B1 * | 12/2005 | Song et al. | 280/279 |
| 7,118,302 B1 * | 10/2006 | Durham | 403/344 |
| 7,207,585 B2 * | 4/2007 | Czysz | 280/276 |
| D542,718 S * | 5/2007 | Costa | D12/118 |
| 7,441,622 B2 * | 10/2008 | Costa | 180/219 |
| 7,490,843 B2 * | 2/2009 | Czysz | 280/283 |
| 7,578,514 B2 * | 8/2009 | Czysz | 280/276 |
| 7,832,752 B2 * | 11/2010 | Czysz | 280/283 |
| 2002/0153692 A1 | 10/2002 | Goldammer et al. | |
| 2005/0127636 A1 | 6/2005 | Czysz | |

FOREIGN PATENT DOCUMENTS

| | | |
|---|---|---|
| EP | 0 245 221 A2 | 11/1987 |
| EP | 1 992 555 A1 | 11/2008 |
| FR | 2 859 167 A1 | 3/2005 |
| FR | 2 901 227 A1 | 11/2007 |

* cited by examiner

Fig.22

CLAMPING SYSTEM FOR A VEHICLE FORK WITH A SUSPENSION SYSTEM

FIELD OF THE INVENTION

The invention concerns vehicles with two or three wheels, featuring a fork with a suspension system, and more particularly a clamping system for a front fork with a suspension system including a lower triple clamp and an upper support. It applies in particular but not exclusively to motorcycles, mopeds, scooters or mountain bikes.

PREVIOUS TECHNIQUE

Figure 1:
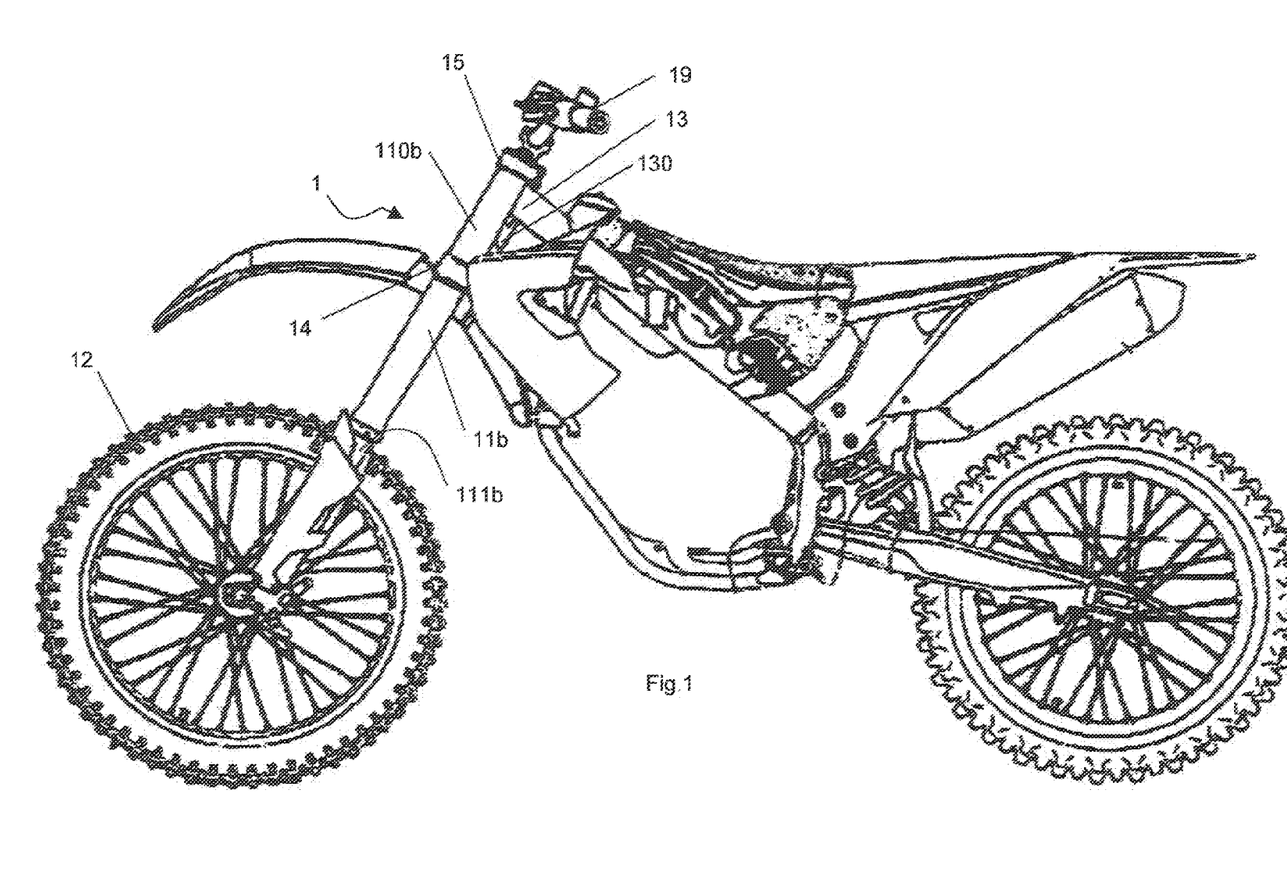
FIG. 1 shows a general view of a vehicle featuring the former solutions.

A front fork with a suspension system 1 for vehicles with one front wheel usually features, as shown in FIG. 1, two shock absorbers 11a, 11b fitted parallel to one another and at the end of which a rotating front wheel 12 is mounted. A clamping system links the shock absorbers to the other end so as to mount the unit in a way that enables it to pivot as compared with the vehicle frame 13.

Figure 2:
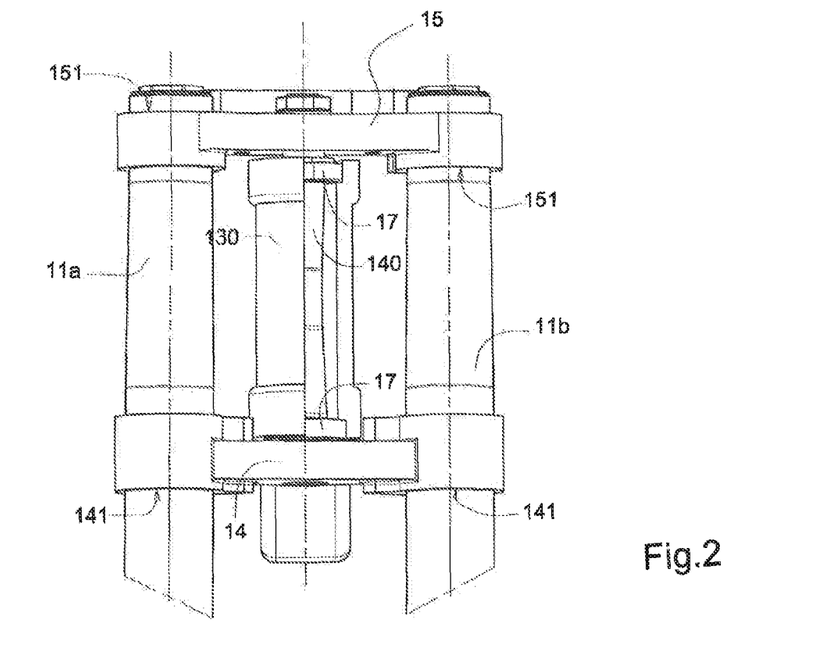
FIG. 2 shows a detailed front view of a fork from the vehicle shown in FIG. 1.

As can be seen in FIGS. 1 and 2, the fork clamping system features a lower triple clamp 14 and an upper triple clamp 15. The lower triple clamp 14 has a fork shaft 140 designed to be mounted on the vehicle frame 13 in a way that enables it to pivot. To do so, the frame 13 has a steering column tube 130 through which the fork shaft 140 is fitted and held in place by two guiding units 17 such as ball or roller bearings. The upper triple clamp 15 is fixed to the end of the fork shaft 140 in a way that enables it to pivot and clamped in place. A handlebar 19 is fixed on the upper triple clamp 15 to enable the rider to turn the fork and hence steer the vehicle.

The shock absorbers 11a, 11b are fitted in lower housings 141 and upper housings 157 placed respectively in the lower triple clamp 14 and in the upper triple clamp 15. They are held in place by clamping the housings 141, 151, for example by screws going through a slot placed longitudinally in the housings 141, 151. The shock absorbers 11a, 11b are telescopic and feature an outer tube 110a, 110b in which a sliding tube 111a, 111b is fitted. In what is known as the conventional layout, the sliding tubes 111a, 111b are mounted on the clamping system and the outer tubes 110a, 110b are fixed on the wheel rotation spindle 12. There is also what is known as an inverted fork assembly, in which the outer tubes 110a, 110b are mounted on the clamping system and the sliding tubes 111a, 111b are fixed on the wheel rotation spindle, as shown in FIG. 1.

A recurrent problem is found on forks with suspension systems 1 of this type. The problem is that of permanent twisting of the fork. Indeed, there are many situations in which a very high level of torsion force is applied between the wheel 12 and the handlebar 19. To give an example, this type of situation is met with when the wheel is in a rut and the rider tries to turn the handlebar; when the rider has fallen and the wheel 12 is resting on the ground and parallel to it, while one end of the handlebar 19 is caught on the ground; or on landing after a jump with the front wheel in a turning position. Cases have also been noted in certain braking situations, concerning vehicles fitted with a single brake disc.

Figure 3:
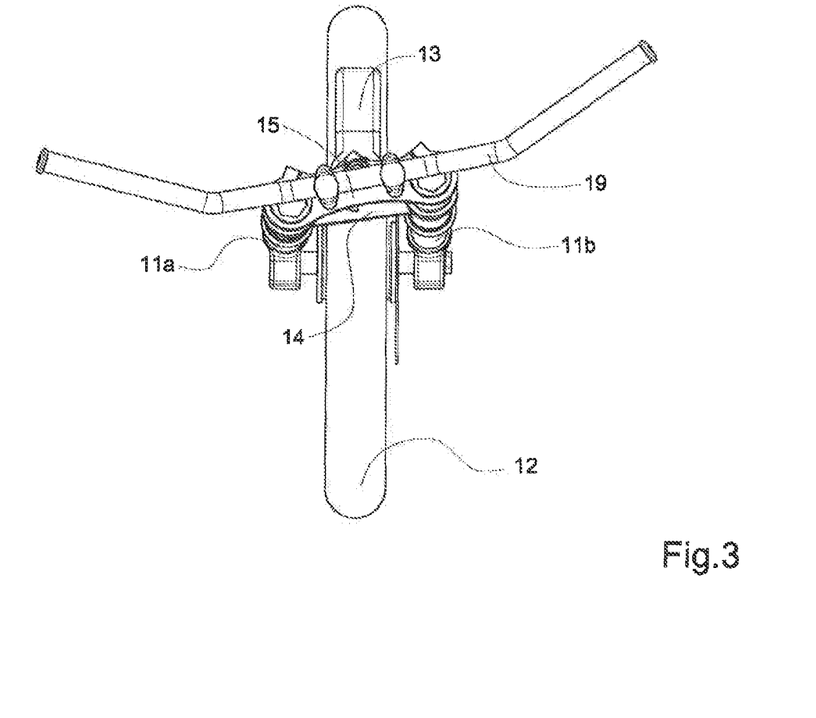
FIG. 3 shows a view from above of the fork from the vehicle in FIG. 1, illustrating the twisting defect likely to occur.

When the fork is placed under very high levels of torsion force, the shock absorbers 11a, 11b pivot as they slide in the housings 141, 151 and the upper triple clamp 15 pivots on the fork shaft 140. The shock absorbers 11a, 11b are thus put out of alignment and the plane of the wheel 12 is no longer perpendicular to the handlebar 19, as is shown in FIG. 3. The rider is thus placed in an asymmetrical position, which makes it difficult to control the vehicle. Many riders have had to retire from motorcycle competitions due to the impossibility for the competitor of continuing the ride efficiently after an incident of this type has occurred. To counter this situation, it is in fact necessary to loosen all the clamps on the housings 141, 151 and the upper triple clamp 15 on the fork shaft 140 to realign the parts, and then re-tighten all the elements. In some extreme cases, the lower triple clamp 14 may be twisted, and hence need to be replaced.

The phenomenon of slipping in the housings 141, 151, in particular the lower housings 141, is particularly noticeable with inverted forks. This is because the lower housings 141 are clamped on the outer tube 110a, 110b, which tends to reduce the internal diameter of the outer tube. As the outer tube is used to guide the sliding tube 111a, 111b with rather narrow clearances, excessive clamping of the outer tube could prevent correct movement of the sliding tube. To increase the level of adherence between the outer tube 110a, 110b and the lower housing 141, certain manufacturers have increased the height of the lower housing 141. However, this modification has proved insufficient and results in bulky parts.

Figure 20:
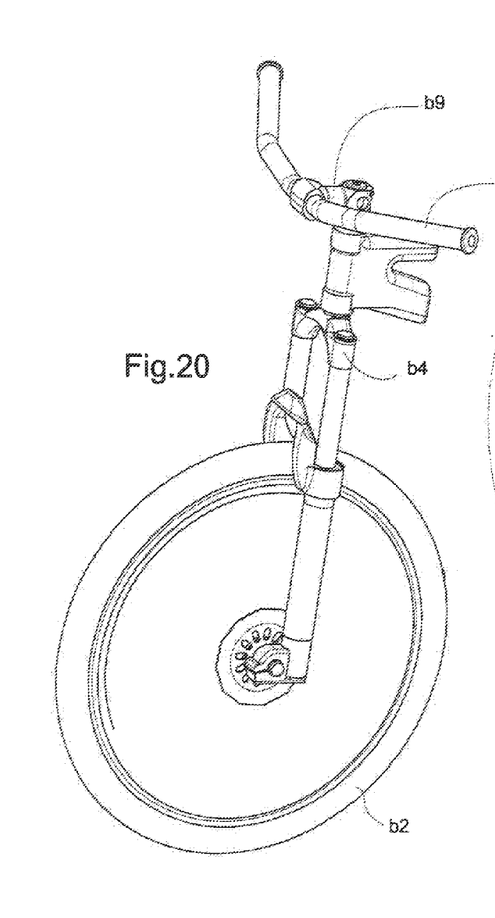
FIG. 20 shows a perspective view of a bicycle fork using the previous solutions.

Some bicycles, and in particular bicycles designed for riding down mountainsides, are equipped with the same type of fork. Other forks, as shown in FIG. 20, have no upper triple clamp, only a lower triple clamp b4 and a stem b9 on which the handlebar b90 is fixed. In the event of strong torsional forces, the stem b9 may slip in the fork shaft, or the fork shaft itself may be twisted. This also results in misalignment of the handlebar b90 as compared with the wheel b2.

OBJECTIVES OF THE INVENTION

The purpose of the invention is to provide a fork featuring a suspension system with a clamping system that reduces the likelihood of permanent twisting.

DETAILS OF THE INVENTION

With these objectives in mind, the invention concerns a clamping system for a vehicle fork with a suspension system, featuring a lower triple clamp and an upper support, with the lower triple clamp having a lower plate and a fork shaft to be mounted in a way that enables pivoting on the vehicle frame; the lower plate has two lower housings to receive two shock absorbers fitted parallel to one another and to the front of the fork shaft, and the clamping system features fastening devices to assemble the upper support on the fork shaft. The system also includes stiffening devices set apart from the fork shaft to maintain the relative alignment of the lower triple clamp and the upper support.

By completing the clamping system with stiffening devices set apart from the shaft, able to prevent twisting slippage of the upper support on the fork shaft, it is possible to avoid occurrence of misalignment between the handlebar and the wheel. Use of the vehicle is hence no longer disturbed by an incident of this type, whether the use is during a competition, or for leisure or travel purposes.

The invention concerns the case in which the upper support is an upper triple clamp with two upper housings, and with each upper housing aligned with one of the lower housings and receiving one of the shock absorbers. The housings in the upper triple clamp and the lower triple clamp remain aligned, so the shock absorbers remain parallel with one another. The fork no longer undergoes any permanent deformation, and the problems encountered concerning former solutions are dealt with, without any need to increase the height of the lower housing.

The invention also concerns the case in which the upper support is a stem designed to support a handlebar. By adding stiffening devices set apart from the fork shaft, the stresses on the latter are reduced, and the link between the fork and the handlebar is made very rigid. In particular, this avoids having the stem slip round in the fork shaft.

In a first layout, the stiffening devices include a bracing means linking the upper support to the lower plate. Even if the upper support is inserted on the fork shaft in a way that enables it to pivot, and if it tends to do so, any such movement is prevented by the bracing means between the upper support and the lower plate.

In accordance with one execution method, the bracing system features at least one tie rod linking the upper support to the lower plate in an oblique direction as compared with the axis of the fork shaft and offset from the said axis. Any pivoting movement of the upper triple clamp would tend to pull on the tie rod, which it resists. All such pivoting is thus prevented.

In a first variant, the bracing system has two tie rods in more or less the same plane and crossed over, with each tie rod anchored near one of the lower housings. This layout, which forms a diagonal cross, is able to absorb forces at points lying well away from the fork shaft, and hence blocks very efficiently any tendency for the upper support to pivot on the shaft. With two crossed tie rods, the forces are absorbed in both pivoting directions. Moreover, the layout is very easily accessible from the front of the vehicle.

In accordance with a particular layout, the system includes clamping means placed against the plates; the clamping means have lugs to anchor the tie rods. This makes it possible to equip a fork featuring a suspension system with a clamping system in accordance with the invention, without replacing the lower triple clamp or the upper triple clamp.

For example, the clamping means can have a ring shape and be designed to fit on the shock absorbers. The ring shape guides the clamping mean on the shock absorber. The traction exerted by the tie rod holds the clamping mean against the plate, and the only remaining requirement is that of a device to prevent the clamping mean from rotating and hold it firmly in place. That device can take the form of a limit stop designed to grip one side of the plate. It can also take the form of two clamping means joined together like a pair of glasses.

In one particular way, the upper triple clamp and the lower plate feature lugs standing out forwards to anchor the tie rods. With the lugs, systems are provided to anchor the tie rods, such as holes through the lugs, or locations for hooks.

In a second variant, the stiffening system includes two tie rods, lying on each side of a longitudinal plane passing through the axis of the fork shaft and perpendicular to the plane defined by the axes of the housings, with the tie rods placed more or less in the same direction. As the tie rods are placed on each side of the shaft, they have opposing directions of action, and they complete one another to act against any tendency to pivot on the part of the upper support.

In accordance with another method of execution, the bracing system includes at least one plate fixed on the upper triple clamp and also on the lower triple clamp, in a plane lying well away from the axis of the lower triple clamp. The plate plays the same role as the two tie rods. It can be placed on the front of the fork, or on one side. It is possible to envisage fixing two plates to better spread the forces.

In accordance with another method of execution, the bracing system includes at least one distance piece whose ends are fixed on the upper triple clamp and the lower plate. Once the plates have been fixed against the distance piece using assembly devices, the three parts together form a rigid unit that is difficult to deform and is able to keep the shock absorbers parallel to one another.

In accordance with a further development, the upper triple clamp includes an adjusting ring designed to set a tension on the fork shaft guidance systems. The adjusting ring can be used to compensate for the fact that the distance between the plates is imposed by the distance piece.

In accordance with a second layout, the lower housings and the upper housings have anti-rotation systems using obstacles. This means that the upper triple clamp's tendency to pivot as compared with the lower plate is countered by the shock absorbers linking the two parts in a fixed way, thanks to the anti-rotation systems.

In one particular way, the anti-rotation system consists of a polygonal or splined assembly.

BRIEF DESCRIPTION OF THE FIGURES

The invention is easier to understand, and other particularities and advantages can be grasped, on reading the description set out below. The description refers to the attached drawings, among which.

to DETAILED DESCRIPTION

Figure 4:
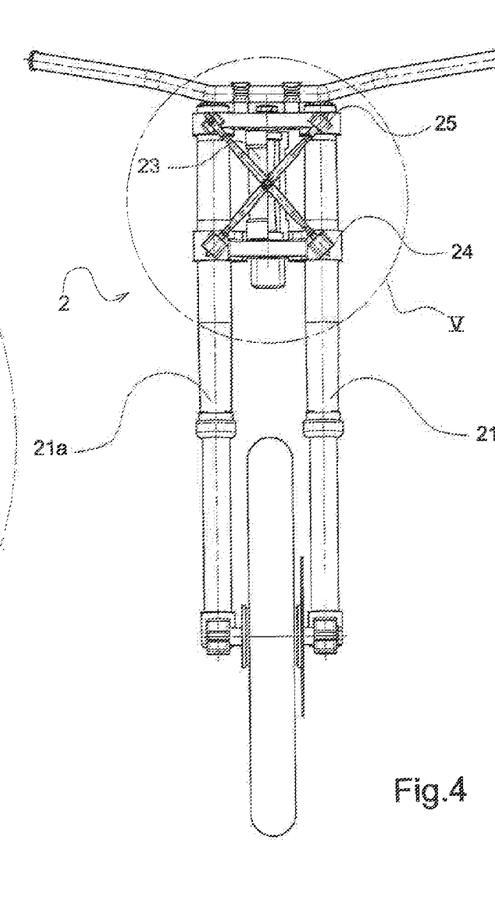
FIG. 4 shows a view of a fork in accordance with a first variant of a first method of execution for the invention.
Figure 5:
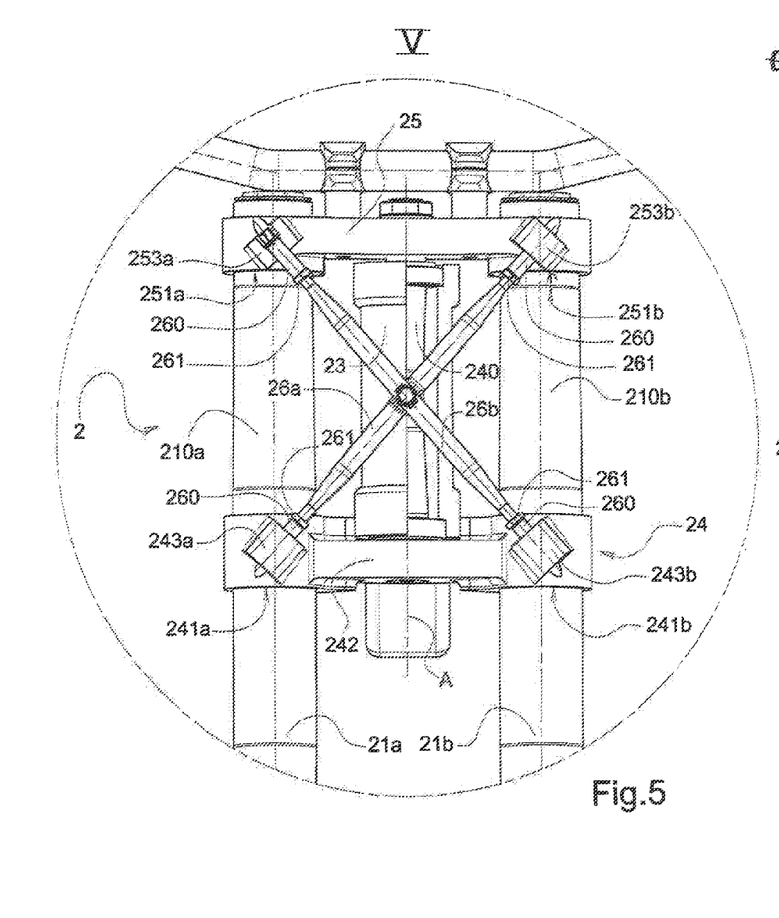
FIG. 5 shows a view of detail V in FIG. 4.
Figure 6:
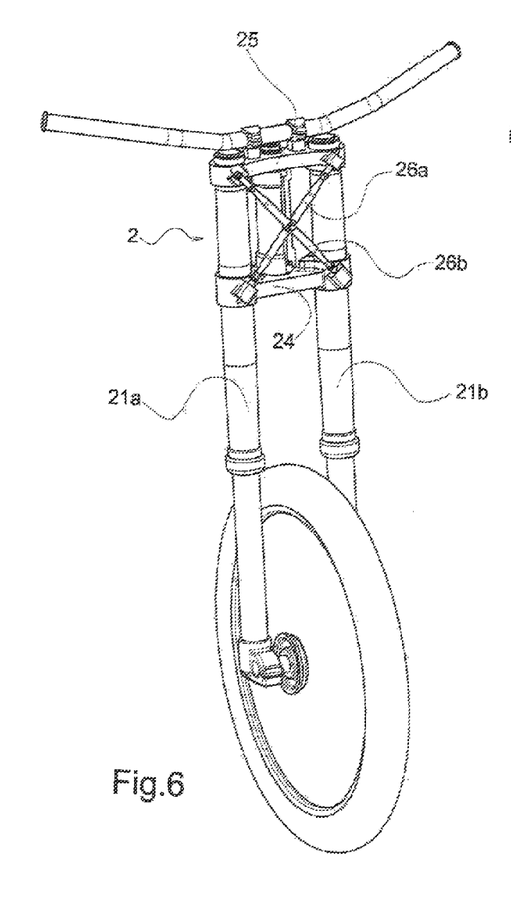
FIG. 6 shows a perspective view of the fork in FIG. 4.

In a first variant of a first method of execution for the invention, shown in FIGS. 4 to 6, a clamping system to mount a fork 2 featuring a suspension system includes, as in the former solutions shown in FIGS. 1 to 3, a lower triple clamp 24 and an upper triple clamp 25. The lower triple clamp 24 has a lower plate 242 and a fork shaft 240 mounted in a way that enables it to pivot on the vehicle frame 23. The lower housings 241a, 241b and the upper housings 251a, 251b are designed in the same way as for the former solutions, with devices no clamp the outer tube 210a, 210b of a shock absorber 21a, 21b. The clamping system also has classic fastening devices to assemble the upper triple clamp 25 on the fork shaft 240.

Further stiffening devices are included in the form of two tie rods 26a, 26b. Each tie rod 26a, 26b links the lower plate 242 to the upper triple clamp 25. The first tie rod 26a links a lug 243a near the lower right housing 241a to a lug 253b near the left housing 251b of upper triple clamp 25, whereas the second tie rod 26b links a lug 243b near the lower left housing 241b to a lug 253a near the right housing 251a of upper triple clamp 25. The lugs 243a, 243b, 253a, and 253b stand out towards the front of the vehicle. The tie rods 26a, 26b cross over their centre with an assembly known as a halving crossover joint. Each lug 243a, 243b, 253a, and 253b has a hole drilled through it, containing a nut from tie rod 260 which holds one end of the corresponding tie rod. Locknuts 261 are fitted to hold the nuts of tie rod 260 in place on the tie rods.

When fitting the clamping system, the work is carried out in the same way as for the system involving the former solutions, in particular to fit the shock absorbers 21a, 21b on the lower triple clamp 24, the lower triple clamp 24 on the frame 23 and the upper triple clamp 25 on the fork shaft 240. Then the nuts of tie rod 260 are inserted in the holes drilled, placing tie rod 26a, 26b facing the nuts of tie rod 260. The nuts of tie rod 260 are screwed in until tie rods 26a, 26b, are held taut, taking care to apply symmetrical traction. A screw is then put through the crossover point of the tie rods to limit the relative vibrations of tie rods 26a, 26b. A system of this type is easy to fit instead of the original lower triple clamp and upper triple clamp, so it can be proposed. as a replacement part for an existing vehicle. The crossover's position well away from axis A of the fork shaft 240 gives tie rods 26a, 26b considerable efficiency in preventing the upper triple clamp 25 from pivoting on the fork shaft 240.

Figure 7:
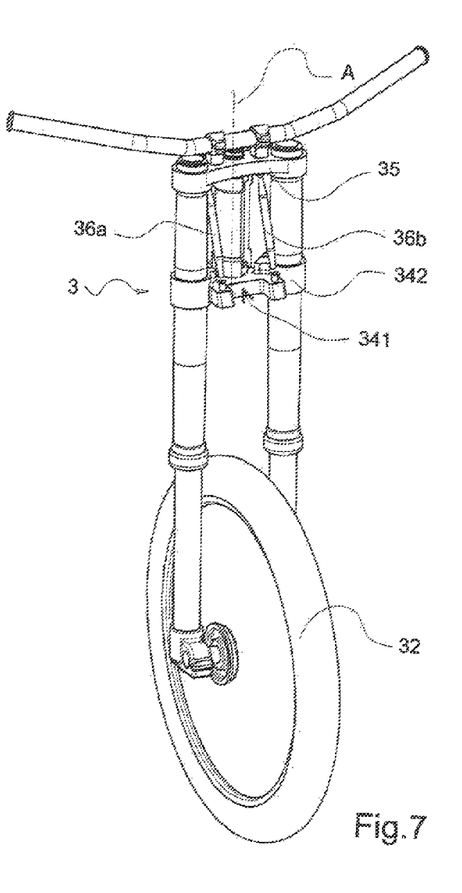
FIG. 7 shows a view similar to that in FIG. 6, of a second variant for the first method of execution.

In a second variant of the first method of execution, shown in FIG. 7, each tie rod 36a, 36b is placed in a plane parallel to the plane of the wheel 32, on each side of axis A of the fork shaft. The tie rods 36a, 36b are parallel with one another and they go from one side of the front 341 of the lower plate 342 to one side of the back of the upper triple clamp 35. This means that the plane defined by the tie rod axes is inclined as compared with axis A of the fork shaft. The tie rods 36a, 36b are fixed and tautened by the tie rod nuts in the same way as in the first method of execution, with the tie rod nuts going through oblique holes drilled in the lower plate 342 and the upper triple clamp 35 respectively. The fitting process is similar to that for the first variant. The clamping system in accordance with this variant has the same effects and the same advantages as the first variant. Furthermore, it leaves a free space in front between the lower triple clamp and the upper triple clamp, for example to fix an accessory such as a headlight.

In a variant not shown, the tie rods are placed on each side of the upper and lower housings.

Figure 8:
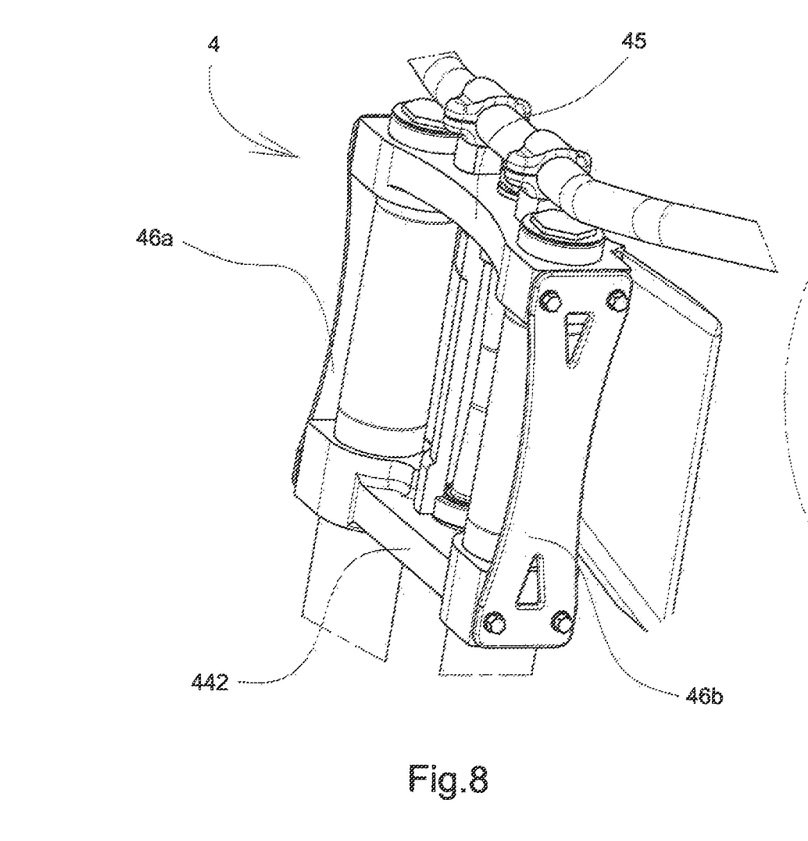
FIG. 8 shows a perspective view of the top of a fork in accordance with a second method of execution for the invention.

In accordance with a second method of execution for the clamping system 4 concerning the invention, shown in FIG. 8, stiffening devices are provided by two plates 46a, 46b fitted on the sides of the clamping system and held in place by screws. Each plate 46a, 46b links the lower plate 442 to the upper triple clamp 45. The plates prevent respective misalignment of a lower housing as compared with the corresponding upper housing, through their reinforcing effect. Combined with the torsional rigidity of the plates, they thus form a rigid frame that avoids twisting of the fork.

Figure 9:
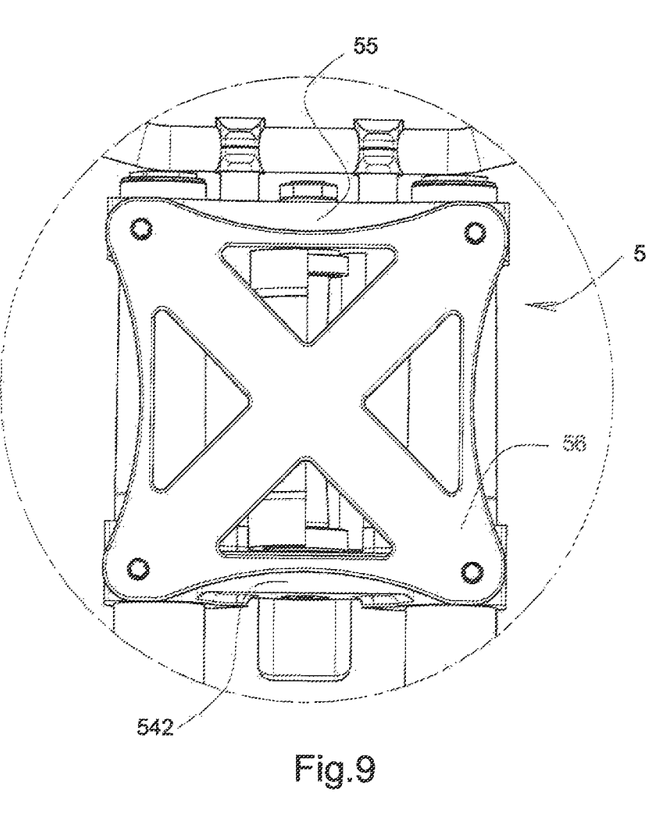
FIG. 9 shows a front view of the upper part of a fork in accordance with a third method of execution for the invention.

In a third method of execution for the invention, the clamping system 5, shown in FIG. 9, features a plate 56 fitted on the front of the lower plate 542 and the upper triple clamp 55. The plate 56 acts in more or less the same way as the tie rods in the first method of execution.

Figures 10, 11:
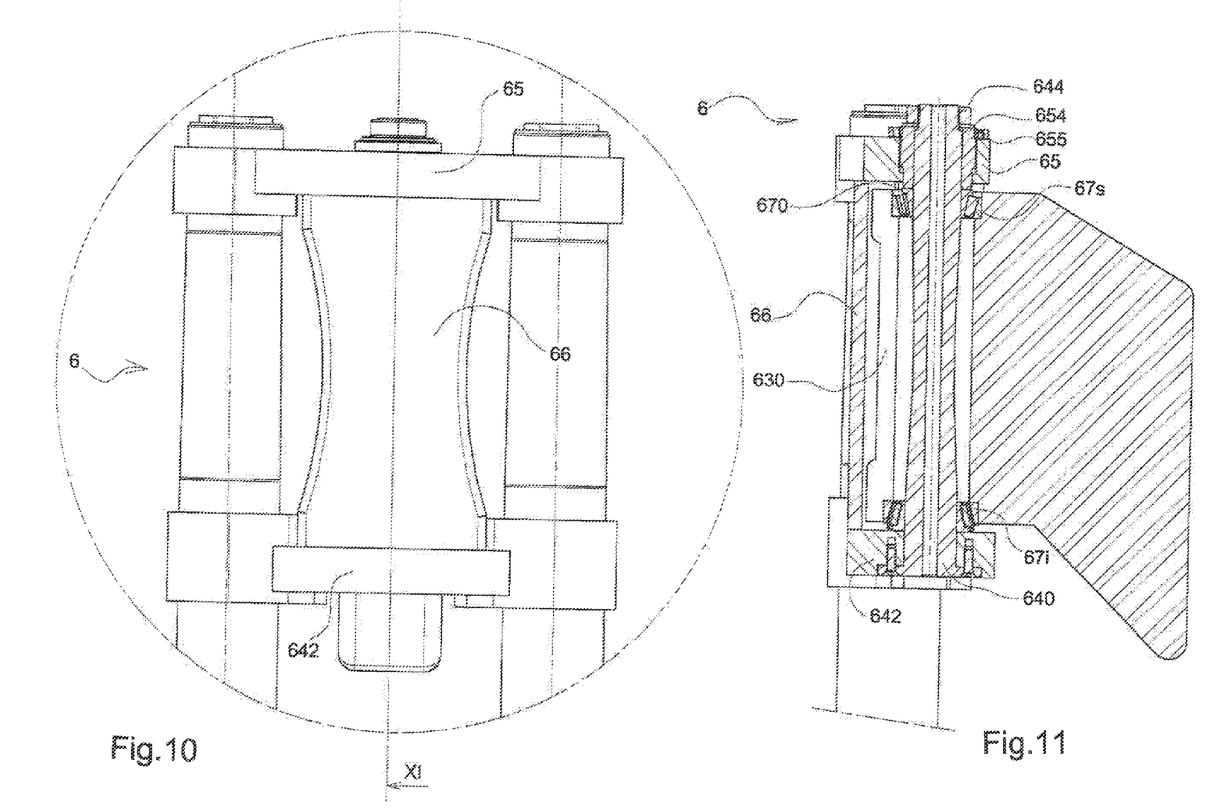
FIG. 10 shows a view similar to that in FIG. 9 of a fourth method of execution for the invention.
FIG. 11 shows a cross-section view along XI-XI of FIG. 10.

With reference to FIGS. 10 and 11, showing a fourth method of execution for the invention, the two plates 642, 65 are linked together by a one-piece spacer 66. The clamping system 6 thus has an I shape. The plates 642, 65 are assembled with the distance piece 66 by screws inserted in the ends of the distance piece 66. The design of the fork pivoting guidance system on the frame is modified as compared with the former solutions. The fork shaft 640 is assembled on the lower plate 642 using removable fittings. This modification is not essential for this method of execution. Two guidance devices 67i, 67s are placed inside a steering column tube 630 and guide the fork shaft 640. A threaded ring 654 is fitted through the upper triple clamp 65 and rests on an inner ring 670 of the upper guidance device 67s. The threaded ring 654 is moved to adjust the position and the prestresses on the guidance devices 67i, 67s. A locknut 655 on the threaded ring 654 rests on the upper triple clamp 65 to lock the threaded ring 654 in place. Moreover, a nut 644 is screwed on the upper end of the fork shaft 640 and rests on the threaded ring 654. This nut 644 is fitted to prevent all play between the end of the fork shaft and the threaded ring 654. The combination of the distance piece 66 and the plates 642, 65 forms a rigid unit that prevents twisting of the fork by keeping the upper and lower housings aligned.

Figure 12:
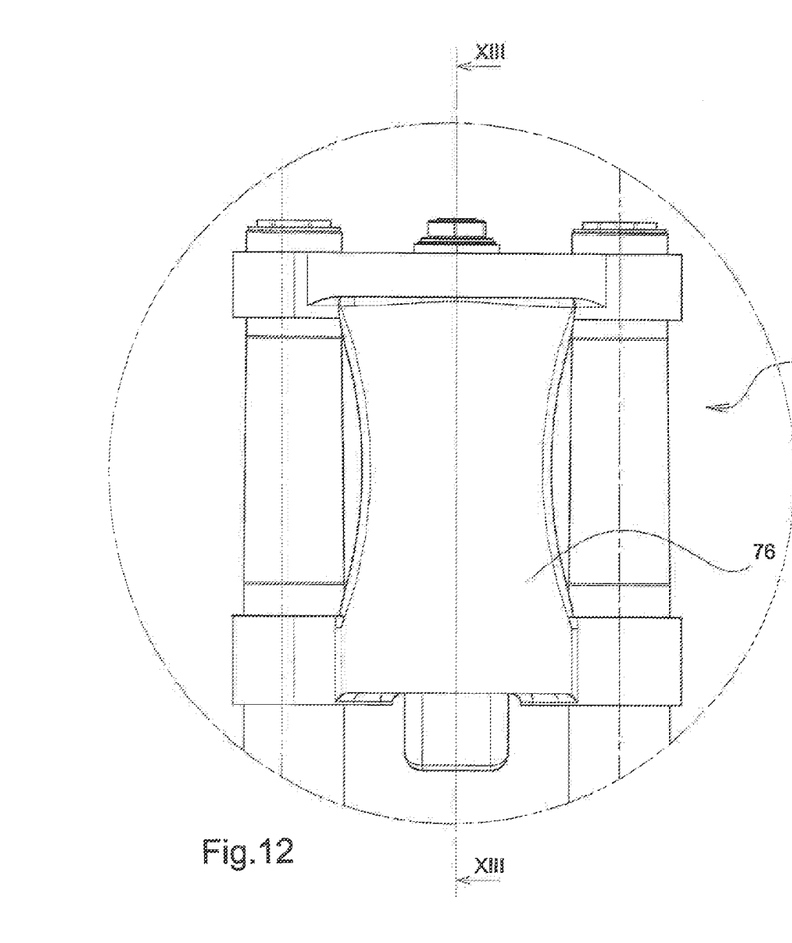
FIG. 12 shows a view similar to that in FIG. 9 of a fifth method of execution for the invention.
Figure 13:
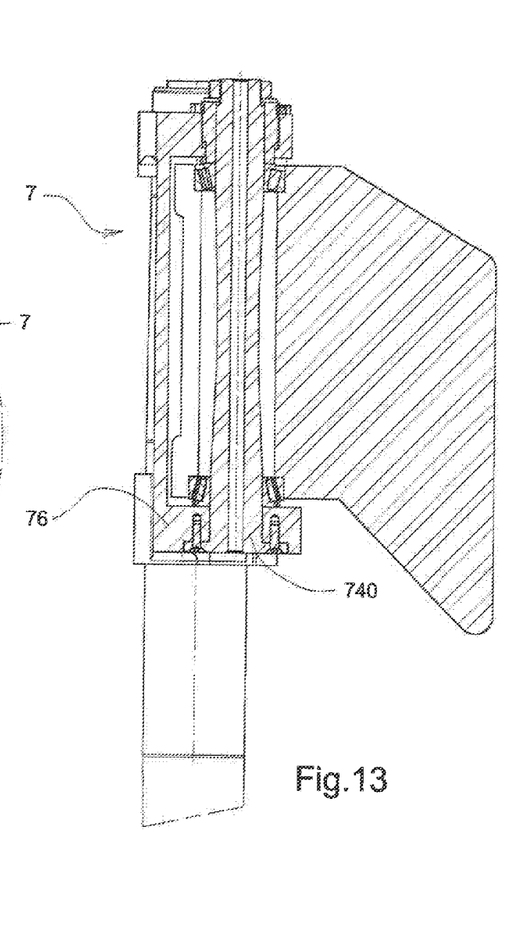
FIG. 13 shows a cross-section view along XIII-XIII of FIG. 12.

In a fifth method of execution for the clamping system 7, shown in FIGS. 12 and 13, the plates and the distance piece similar to those for the fourth method of execution are made in one element 76. The assembly of the fork shaft 740 is similar to that for the fourth method of execution. The effects obtained are the same as those set out above.

Figures 14, 15:
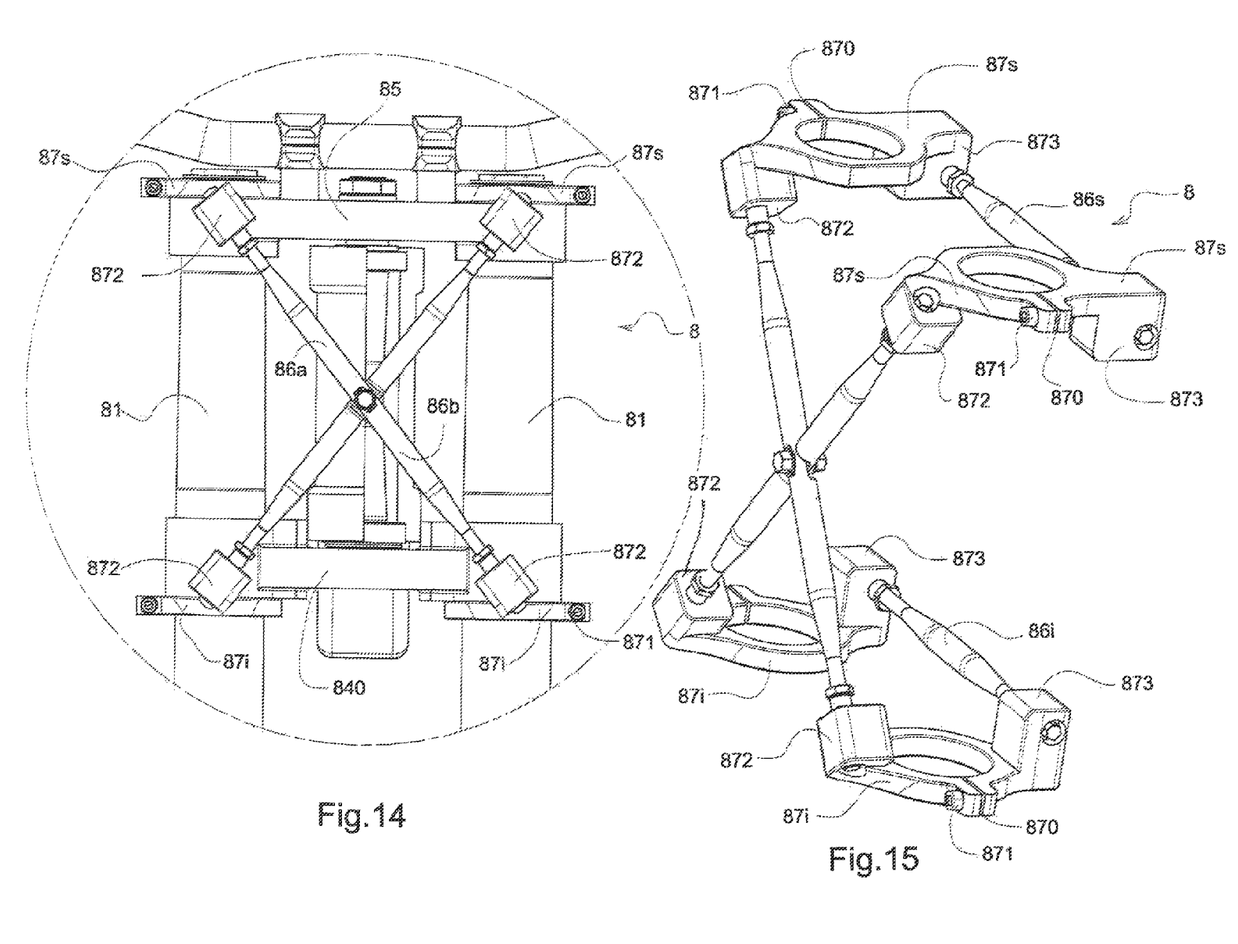
FIG. 14 shows a view similar to that in FIG. 9 of a sixth method of execution for the invention.
FIG. 15 shows a perspective view of the clamping system in FIG. 14.

FIGS. 14 and 15 show a sixth method of execution for the invention concerning the clamping system 8. The clamping system 8 is fitted as a complement to the usual clamping system which has a lower plate 840 and an upper triple clamp 85. The complementary system features four ring-shaped clamping means. In particular, it has a ring 87i, 87s near each housing. Each ring 87i, 87s is fitted against one of the plates 840, 85 on one of the shock absorbers 81. Each ring 87i, 87s has a slot 870 and a corresponding fastening screw 871 going through the slot to hold the ring on the shock absorber 81. Two of the rings 87i, known as the lower rings, are placed under the lower plate 840. Two other rings 87s, known as the upper rings, are placed on the upper triple clamp 85. Each ring 87i, 87s also has a front lug 872 standing out towards the front. Stiffening devices are fitted in the form of two crossed tie rods 86a, 86b, designed and acting in the same way as the tie rods 26a, 26b used in the first method of execution and going through the front lugs 872 of the rings 87i, 87s. The rings 87i, 67s also have rear lugs 873, opposite the front lugs 872. The rear lugs 873 of the lower rings 87i placed against the lower plate 840 are held together by a lower tie rod 86i. In the same way, the rear lugs 873 of the upper ring 87s are held together by an upper tie rod 86s. The extra clamping system provides considerable rigidity, with the crossed tie rods 86a, 86b acting in the same way as in the first method of execution, and the upper and lower tie rods 86i, 86s holding the rings 87i, 87s in place around the shock absorbers 81. Furthermore, the traction on the crossed tie rods 86a, 86b bolds the rings 87i, 87s against the plates 840, 85.

Figure 16:
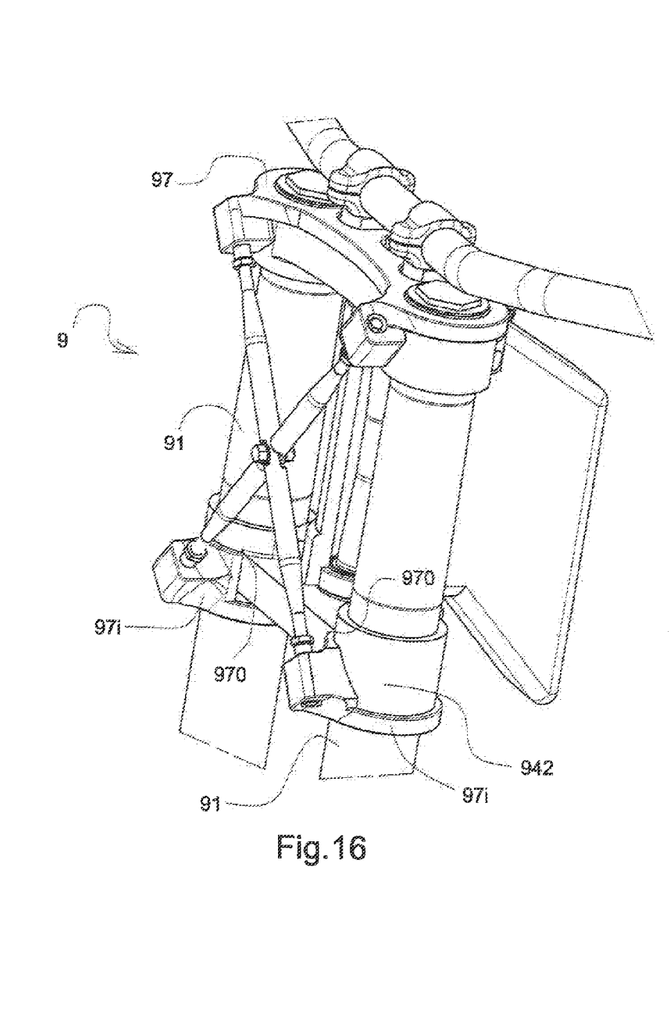
FIG. 16 shows a view similar to that in FIG. 8 of a seventh method of execution for the invention.
Figure 17:
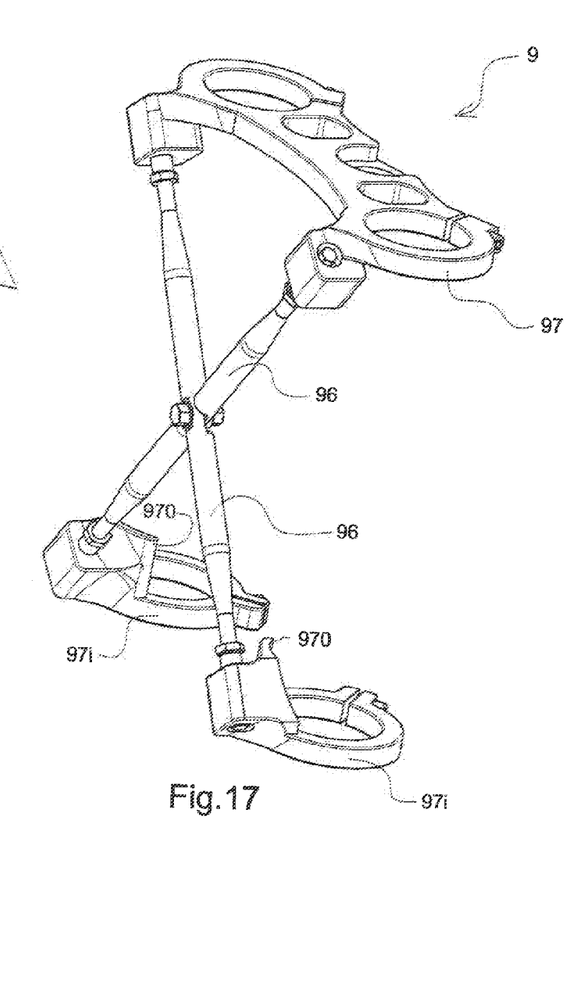
FIG. 17 shows a perspective view of the clamping system in the FIG. 16.

In a seventh method of execution for the invention, shown in FIGS. 16 and 17, the clamping system 9 has crossed tie rods 96 and is set apart from that for the sixth method of execution by an upper clamping mean 97 bringing the upper rings together in a single part. This enables the upper tie rod to be done away with, together with the rear lugs on the upper rings. The clamping system 9 is also differentiated by the fact that the lower rings 97i have limit stops 970 that rest on the lower plate 942, to prevent the ring 97i from pivoting round the shock absorber 91. The limit stops 970 replace the rear lugs on the lower rings 97i and the lower tie rod.

These two modifications can be implemented independently of one another.

Figures 18, 19:
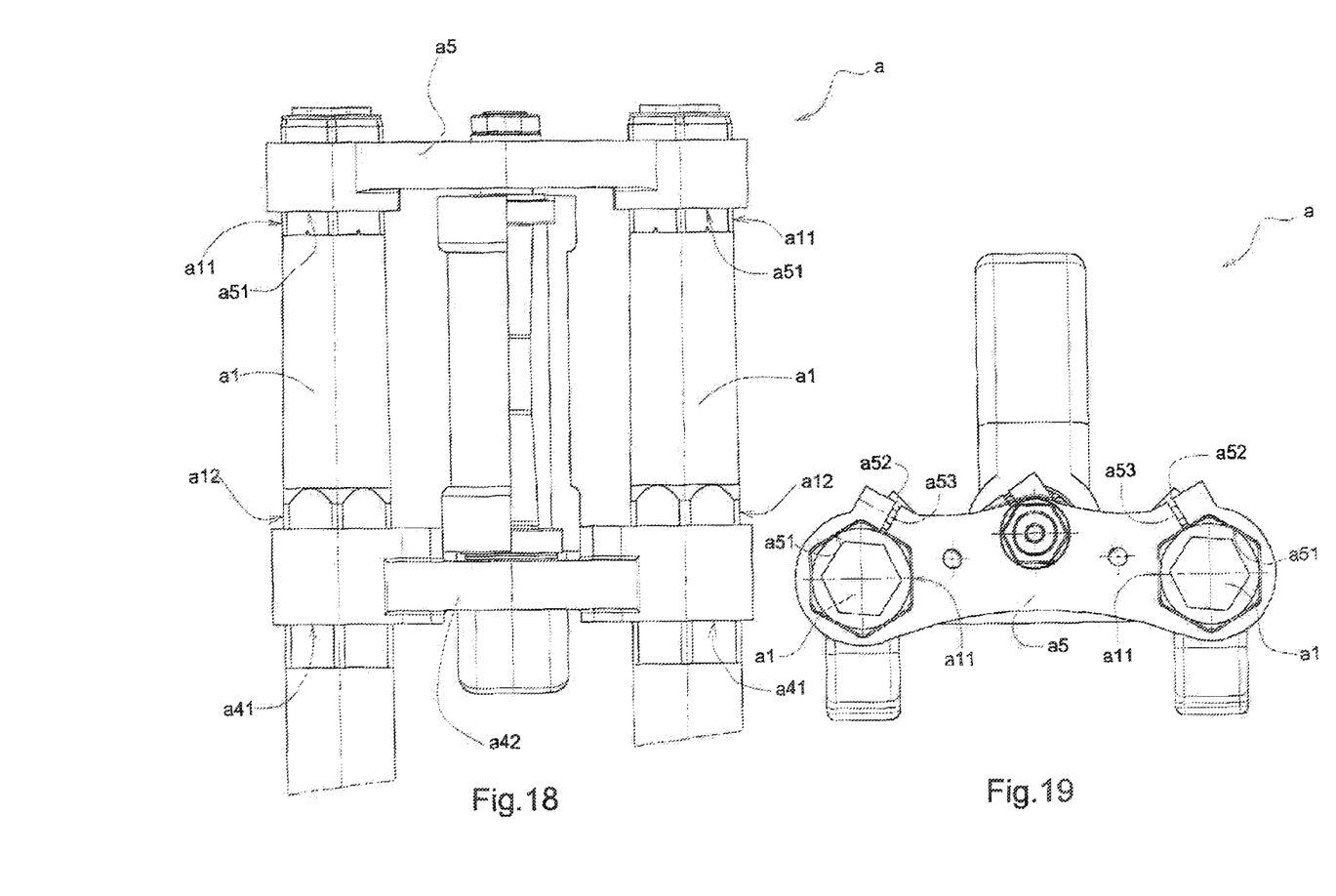
FIG. 18 shows a view similar to that in FIG. 9 of an eighth method of execution for the invention.
FIG. 19 shows a view from above of the clamping system in FIG. 18.

In an eighth method of execution, shown in FIGS. 18 and 19, the clamping system "a" features devices preventing rotation between the shock absorbers a1 on the one hand, and the upper triple clamp a5 and lower plate a42 on the other hand. The anti-rotation devices take the form of polygonal assemblies, such as hexagonal assemblies. The shock absorbers a1 specifically feature two seatings a11, a12 with a hexagonal cross-section. To make assembly possible, the cross-section of the lower housing a41 is bigger than that of the upper housing a51. In the same way as in the former solutions, the housings a41, a51 have a slot a52 and a screw a53 enabling the slot a52 to be narrowed in order to clamp the lower plate a42 or the upper triple clamp a5 on the shock absorbers a1. The assembly process is the same as in the former solutions.

The links preventing all pivoting between the shock absorbers, the upper triple clamp a5 and the lower plate a42 ensure that the upper triple clamp a5 does not pivot as compared with the lower plate a42 and that the shock absorbers a1 remain parallel. This prevents the fork from twisting.

Figure 21:
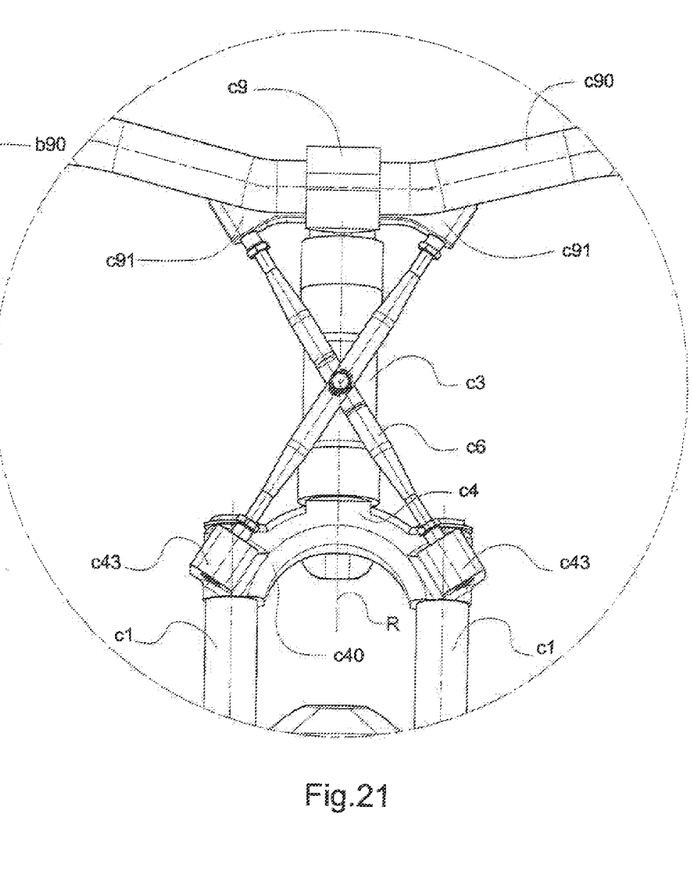
FIG. 21 shows a front view of a bicycle fork equipped with a clamping system in accordance with a ninth method of execution for the invention.
Figure 22:
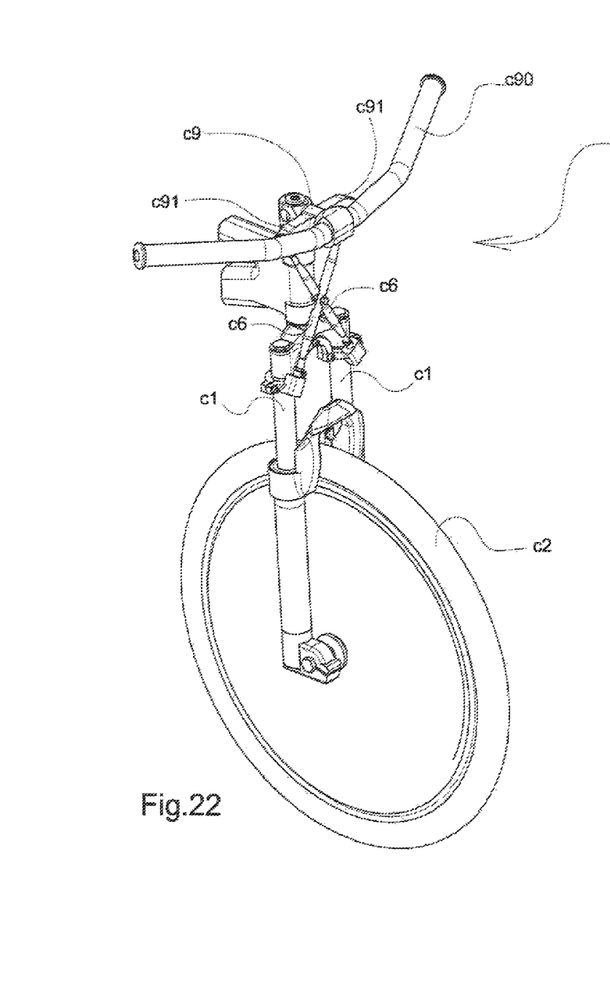
FIG. 22 shows a perspective view of the fork in FIG. 21.
Figure 23:
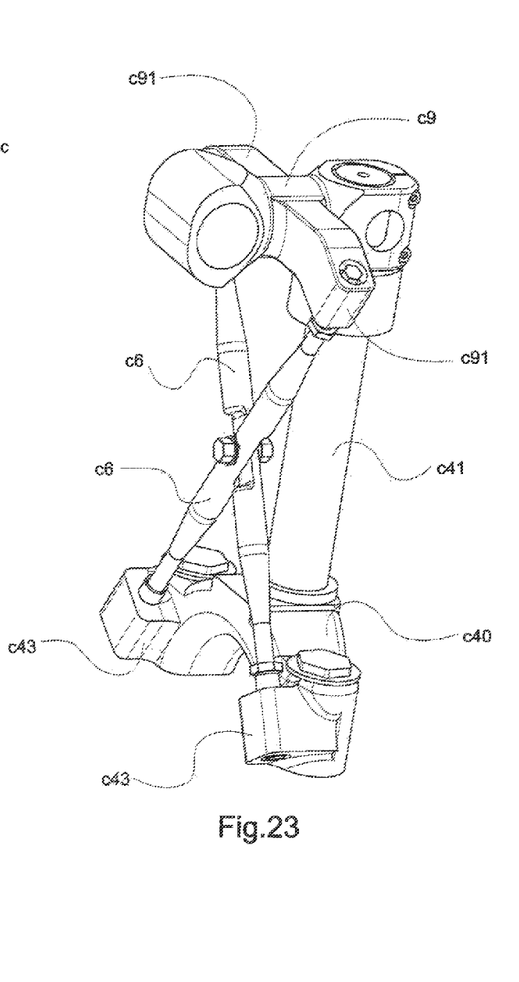
FIG. 23 shows a separate perspective view of the clamping system in FIG. 21.

A ninth method of execution for the invention concerns a clamping system "c" for a bicycle fork and it is shown in FIGS. 21 to 23. The clamping system features a lower triple clamp c4 on which two shock absorbers c1 are fixed. The lower triple clamp c4 has an arch c40 on which a fork shaft c41 in a steering column tube c3 is fixed in the usual way. At the upper end of the tube, the fork shaft has an upper support in the form of a stem c9 on which a handlebar c90 is fixed.

In accordance with the invention, the arch c40 has two lugs c43 protruding towards the front. Moreover, the stem has two arms c91 stretching out more or less perpendicularly to the plane R of the wheel. Each of two crossed tie rods c6, similar to those used in the first method of execution, links an arm c91 to a lug c43.

When torsion is applied between the wheel and the handlebar, the stem may tend to pivot on the fork shaft c41. However, depending on the direction of pivoting, one of the tie rods c6 applies traction between its lug c43 and its arm c91, in an oblique direction and offset from the axis of the fork shaft c41, thus preventing the stem c9 from pivoting.

Figures 24, 25:
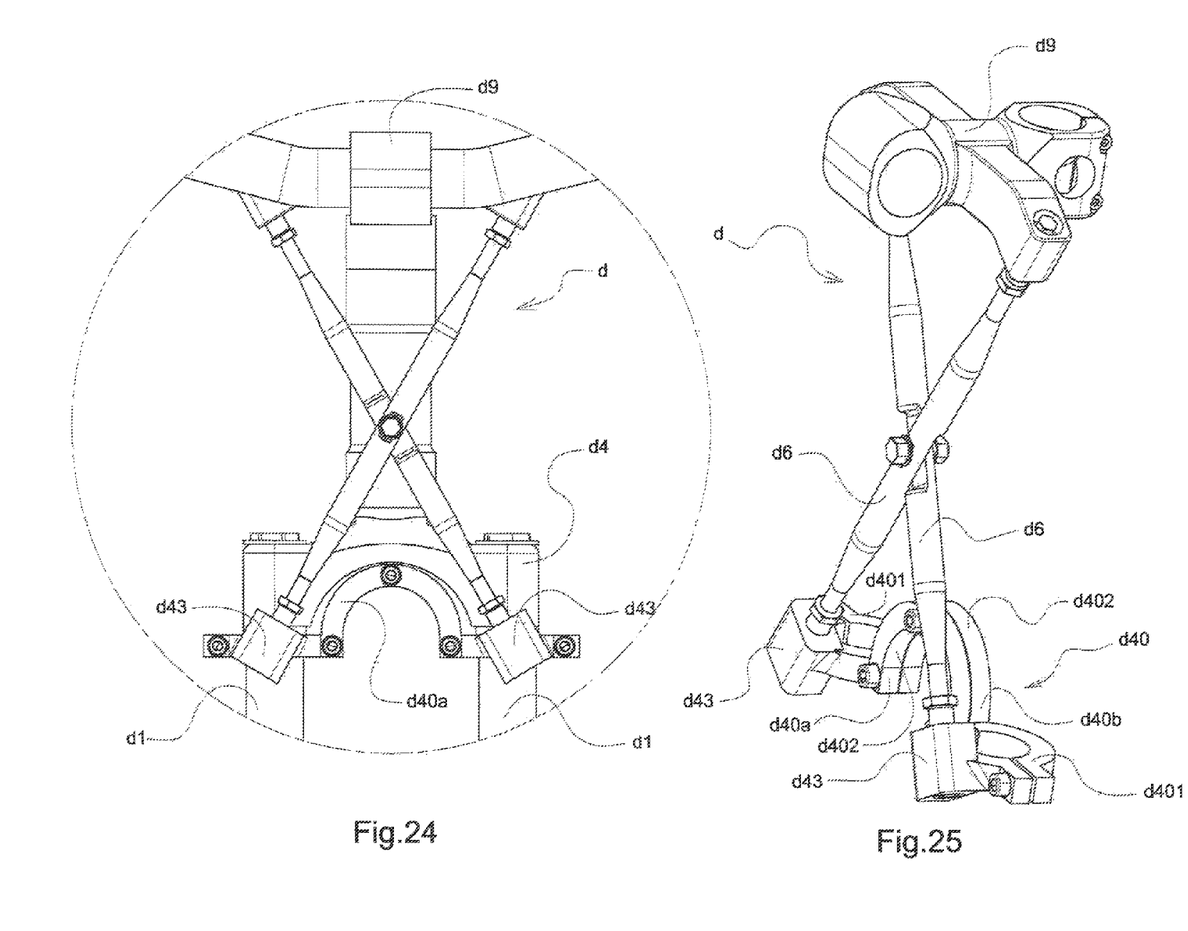
FIG. 24 shows a front view of a bicycle fork equipped with a clamping system in accordance with a tenth method of execution for the invention.
FIG. 25 shows a separate perspective view of the clamping system in FIG. 24.

In a tenth method of execution for the invention, shown in FIGS. 24 and 25, and as a variant to the ninth method of execution, the clamping system "d" has the same stem d9 as previously. However, a lower clamping mean d40 is fixed. on the shock absorbers d1 under the lower triple clamp d4. The lower clamping mean d40 is formed by two half-flanges d40a, d40b assembled with screws. Each half-flange d40a, d40b has two half-clamps d401 partially surrounding the shock absorbers d1 and held together by an arch d402. On the front half-flange d40a, there are two lugs d43 that hold the tie rods d6 in place. This means that the clamping system can be installed on a bicycle without replacing the lower triple clamp d4, and simply by fitting a new stem d9.

The invention claimed is:

1. A clamping system for a vehicle fork with a suspension system, with the system featuring a lower triple clamp and an upper support, the lower triple clamp having a lower plate and a fork shaft to be mounted in a way that enables it to pivot on the vehicle frame, the lower plate having two lower housings to receive two shock absorbers set parallel to one another and in front of the fork shaft, the clamping system including fitting devices to assemble the upper support on the fork shaft, the system being characterized by the fact that it also has removable stiffening devices set apart from the fork shaft to maintain the relative orientations of the lower triple clamp and the upper support, in which the stiffening devices include a bracing system linking the upper support and the lower plate, and in which the bracing system features at least one tie rod linking the upper support to the lower plate in an oblique direction as compared with a central longitudinal axis of the fork shaft and offset from said axis.

2. The clamping system in accordance with claim 1, in which the upper support is an upper triple clamp featuring two upper housings, each upper housing being aligned with one of the lower housings and receiving one of the shock absorbers.

3. The clamping system in accordance with claim 1, in which the upper support is a stem used to support a handlebar.

4. The clamping system in accordance with claim 1, in which the bracing system has two tie rods in more or less the same plane and crossed over, each tie rod being anchored near one of the lower housings.

5. The clamping system in accordance with claim 4, characterized by the fact that it includes clamping means placed against the plates, with the clamping means having lugs to anchor the tie rods.

6. The clamping system in accordance with claim 5, in which the clamping means have a ring shape and are designed to fit on the shock absorbers.

7. The clamping system in accordance with claim 4, in which the upper triple clamp and the lower plate have lugs standing out forwards to anchor the tie rods.

8. The clamping system in accordance with claim 1, characterized by the fact that it includes two tie rods lying on each side of a plane passing through the central longitudinal axis of the fork shaft and perpendicular to the plane defined by the axes of the housings, with the tie rods placed more or less in the same direction.

9. A clamping system for a vehicle fork with a suspension system, with the system featuring a lower triple clamp and an upper support, the lower triple clamp having a lower plate and a fork shaft to be mounted in a way that enables it to pivot on the vehicle frame, the lower plate having two lower housings to receive two shock absorbers set parallel to one another and in front of the fork shaft, the clamping system including fitting devices to assemble the upper support on the fork shaft, the system being characterized by the fact that it also has removable stiffening devices set apart from the fork shaft to maintain the relative orientations of the lower triple clamp and the upper support, in which the stiffening devices include a bracing system linking the upper support and the lower plate, and in which the bracing system includes at least one plate fixed on the upper triple clamp and also on the lower plate in a plane spaced apart from a central longitudinal axis of the fork shaft.

10. The clamping system in accordance with claim 9, in which the upper support is an upper triple clamp featuring two upper housings, each upper housing being aligned with one of the lower housings and receiving one of the shock absorbers.

11. The clamping system in accordance with claim 9, in which the upper support is a stem used to support a handlebar.

12. A clamping system for a vehicle fork with a suspension system, with the system featuring a lower triple clamp and an upper support, the lower triple clamp having a lower plate and a fork shaft to be mounted in a way that enables it to pivot on the vehicle frame, the lower plate having two lower housings to receive two shock absorbers set parallel to one another and in front of the fork shaft, the clamping system including fitting devices to assemble the upper support on the fork shaft, the system being characterized by the fact that it also has removable stiffening devices set apart from the fork shaft to maintain the relative orientations of the lower triple clamp and the upper support, in which the stiffening devices include a bracing system linking the upper support and the lower plate, and in which the bracing system includes at least one distance piece whose ends are fixed on the upper triple clamp and the lower plate.

13. The clamping system in accordance with claim 12, in which the upper triple clamp includes an adjusting ring designed to set a tension level on guidance systems of the fork shaft.

14. The clamping system in accordance with claim 12, in which the upper support is an upper triple clamp featuring two upper housings, each upper housing being aligned with one of the lower housings and receiving one of the shock absorbers.

15. The clamping system in accordance with claim 12, in which the upper support is a stem used to support a handlebar.

16. A clamping system for a vehicle fork with a suspension system, with the system featuring a lower triple clamp and an upper support, the lower triple clamp having a lower plate and a fork shaft to be mounted in a way that enables it to pivot on the vehicle frame, the lower plate having two lower housings to receive two shock absorbers set parallel to one another and in front of the fork shaft, the clamping system including fitting devices to assemble the upper support on the fork shaft, the system being characterized by the fact that it also has removable stiffening devices set apart from the fork shaft to maintain the relative orientations of the lower triple clamp and the upper support, in which the upper support is an upper triple clamp featuring two upper housings, each upper housing being aligned with one of the lower housings and receiving one of the shock absorbers, and in which the lower housings and the upper housings have anti-rotation systems using obstacles.

17. The clamping system in accordance with claim 16, in which the anti-rotation system consists of a polygonal assembly.

18. The clamping system in accordance with claim 16, in which the anti-rotation system consists of a splined assembly.

19. The clamping system in accordance with claim 16, in which the upper support is a stem used to support a handlebar.

* * * * *